(12) United States Patent
Gallotta et al.

(10) Patent No.: US 6,392,654 B1
(45) Date of Patent: May 21, 2002

(54) METHOD AND APPARATUS FOR PROCESSING DATA WITH IMPROVED CONCURRENCY

(75) Inventors: Allen A. Gallotta, Sterling; Thomas E. Frisinger, Hudson, both of MA (US); Adrian Muntianu, Toronto (CA)

(73) Assignee: ATI Technologies, Ontario (CA)

( * ) Notice: Subject to any disclaimer, the term of this patent is extended or adjusted under 35 U.S.C. 154(b) by 0 days.

(21) Appl. No.: 09/144,769

(22) Filed: Sep. 1, 1998

(51) Int. Cl.$^7$ .............................................. G06F 15/16
(52) U.S. Cl. ........................ 345/503; 522/559; 522/565
(58) Field of Search .................................. 345/501, 503, 345/521, 507, 509, 515, 516, 513, 522, 559, 565

(56) References Cited

U.S. PATENT DOCUMENTS

| | | | | |
|---|---|---|---|---|
| 5,182,797 A | * | 1/1993 | Liang et al. ................. | 345/522 |
| 5,329,615 A | * | 7/1994 | Peaslee et al. .............. | 395/502 |
| 5,655,112 A | * | 8/1997 | MacInnis .................... | 345/501 |
| 5,796,413 A | * | 8/1998 | Shipp et al. ................ | 345/522 |
| 5,969,728 A | * | 10/1999 | Dye et al. ................... | 345/515 |
| 6,067,098 A | * | 5/2000 | Dye ............................ | 345/521 |
| 6,097,402 A | * | 8/2000 | Case et al. .................. | 345/512 |
| 6,124,868 A | * | 9/2000 | Asaro et al. ................ | 345/513 |

\* cited by examiner

Primary Examiner—Ulka J. Chauhan
(74) Attorney, Agent, or Firm—Vedder, Price, Kaufman and Kammholz

(57) ABSTRACT

A method and apparatus for processing data with improved concurrency that begins when a host processor an application identifies a memory block of a plurality of memory blocks based on memory block status. The application then provides a data block to the memory block. The data block includes data for processing, which includes application data and operating instructions, and a memory block status update command. A data retrieval command and a sequential updating command are provided to a processing entity by the application. The processing entity then retrieves the data block in accordance with the data retrieval command and processes the memory block status update command to produce an updated memory block status. Finally, the processing entity provides the updated memory block status to the application in accordance with the sequential updating command.

11 Claims, 3 Drawing Sheets

23

METHOD AND APPARATUS FOR PROCESSING DATA WITH IMPROVED CONCURRENCY

TECHNICAL FIELD OF THE INVENTION

The present invention relates generally to processing systems and more particularly to a method and apparatus for improving concurrency between processing entities of processing systems.

BACKGROUND OF THE INVENTION

A computer is known to include a central processing unit, system memory, video graphics circuitry, audio processing circuitry, and peripheral ports. The peripheral ports allow the computer to interface with peripheral devices such as printers, monitors, external tape drives, Internet, etc. In such a computer, the central processing unit functions as a host processor while the video graphics circuit functions as a loosely coupled co-processor. In general, the host processor executes applications and, during execution, calls upon the co-processor to execute its particular function. For example, if the host central processing unit requires a drawing operation to be done, it requests, via a command through a command delivery system, the video graphics co-processor to perform the drawing function.

In many situations, the host central processing unit needs to know the current status of the co-processor, or co-processors, before it can continue with processing the particular application and/or before sending new commands to the co-processor. The host central processing unit obtains such status information from the co-processors via a handshaking protocol. In essence, the hosts central processing initiates the handshaking protocol by polling a co-processor to obtain its status and/or by polling a co-processor register to obtain the stored status. The host processor then determines whether the co-processors status has changed. If so, the host processor updates the co-processor register and continues with additional processing operations. If not, the host processor waits unit the co-processor has completed the current task. Such a technique is known as poll and register writes.

When the host central processing unit continues with processing a particular operation and sending new commands to the co-processor, the processing and sending is done through a buffer. The host central processing unit writes application data and operating instructions into the buffer for the co-processor to read. When the buffer becomes full, the host central processing unit must wait for the co-processor to read the portion of the application data and operating instructions contained in a data block of the buffer before it can resume writing to an empty data block within the buffer.

As such, concurrency between the host central processing unit and the co-processor is reduced. By requiring the host central processing unit to continually check the co-processors progress before it can continue with processing a particular operation and sending new commands to the co-processor, the host central processing unit and co-processor's operations are interdependent.

Therefore, a need exists for a method and apparatus for processing data with improved concurrency.

DETAILED DESCRIPTION OF A PREFERRED EMBODIMENT

Generally, the present invention provides a method and apparatus for processing data with improved concurrency. Such processing begins when an application identifies a memory block of a plurality of memory blocks based on memory block status. The application then provides a data block to the memory block. The data block includes data for processing, which includes application data and/or operating instructions, and a memory block status update command. A data retrieval command and a sequential updating command are provided to a processing entity by the application. The processing entity then retrieves the data block in accordance with the data retrieval command and processes the memory block status update command to produce an updated memory block status. Finally, the processing entity provides the updated memory block status to the application in accordance with the sequential updating command. With such a method and apparatus, the processing entity retrieves a data block from memory and, after the data block has been retrieved, sends an updated memory block status to the application. The application is no longer required to continually check the processing entity's progress to obtain its current status.

Figure 1:
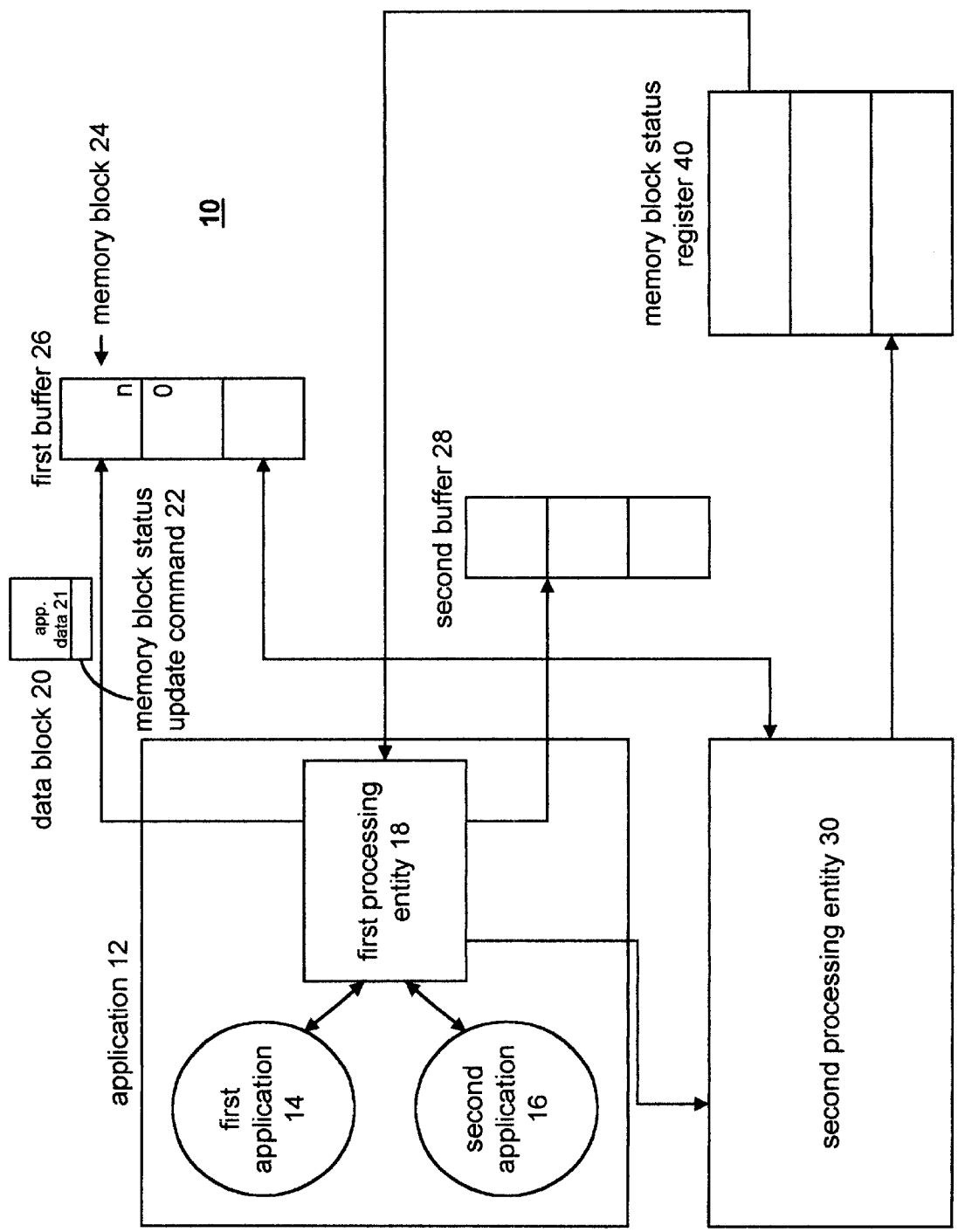
FIG. 1 illustrates a schematic block diagram of a data processing system in accordance with the present invention.

The present invention can be more fully described with reference to FIGS. 1 through 3. FIG. 1 illustrates a schematic block diagram of a data processing system 10 that includes an application 12, a first buffer 26, a second buffer 28, a second processing entity 30, and a memory block status register 40. The application 12 includes a first application 14, a second application 16, and a first processing entity 18. The first processing entity 18 may be a central processing unit within a personal computer, laptop computer, and/or work station, or may be a stand-alone processing device such as a micro-processor, micro-controller, digital signal processor, and/or any other device that manipulates digital information based on programming instructions.

In operation, the first processing entity 18 writes data blocks, such as data block 20, to the first buffer 26. Data block 20 contains application data and/or operating instructions 21 that is sent to a memory block, such as memory block 24, in the first buffer 26 based on the processing of the application and memory block status. The application data 21 includes a memory block status update command 22 that provides an updated memory block status to the memory block 24 in first buffer 26. First buffer 26 and second buffer 28, which are respectively managed by the first application 14 and the second application 16, may be system memory, local memory to the application 12, local memory to the second processing entity 30, or a combination thereof The memory may be constructed of random access memory, floppy disk memory, hard disk memory, magnetic tape memory, CD memory, DVD memory, and/or any device that stores digital information. Further, the first buffer 26 is arranged in a ring buffer such that the last data element n is followed by the first data element 0. In this manner, the application 12 writes the application data 21 of data block 20 into the ring buffer in a circular fashion. The writing of data into a ring buffer is known to those of average skilled in the art, thus no further discussion will be provided except to facilitate the understanding of the present invention.

The application 12 provides signals to the second processing entity 30. The signals, which include a data retrieval command and a sequential updating command, are provided to the second processing entity 30 when the application data 21 was provided to memory block 24. The second processing entity 30 processes the application data 21 and the memory block status update command 22 in accordance with the sequential updating command and updates the memory block status register 40. Basically, the application 12 provides instructions to the second processing entity 30 indicating the manner in which data elements are to be retrieved from the first buffer 26. The second processing entity 30 may be a microprocessor, microcontroller, digital signal processor, processor on a video graphics card, and/or any other device that manipulates digital information based on programming instructions. The memory block status and the updated memory block status are stored in the memory block status register 40 by the second processing entity 30. The updated memory block status is then provided to register 40 in accordance with the sequential updating command such that the first processing entity 18 of application 12 may retrieve the information.

Figure 2:
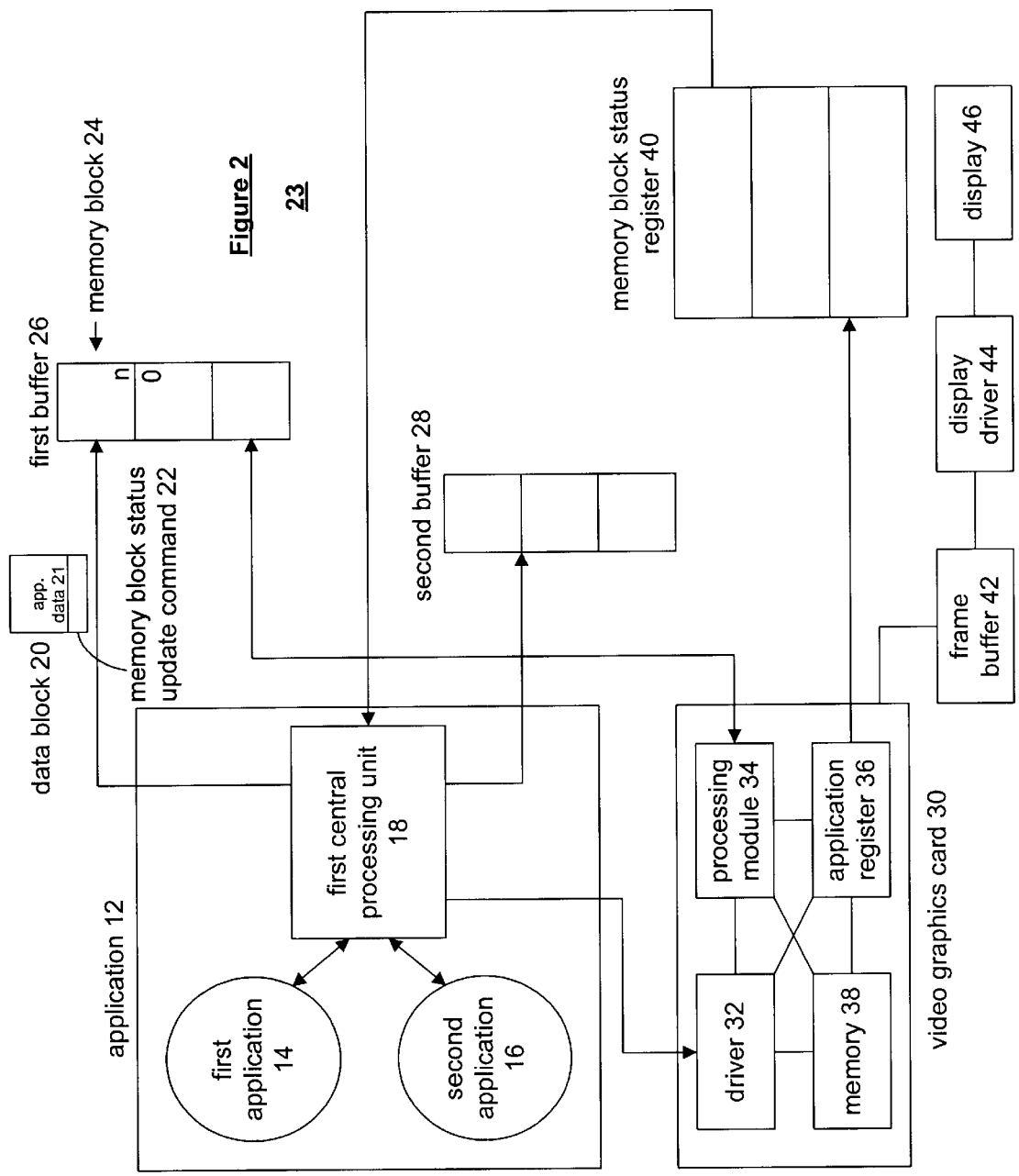
FIG. 2 illustrates a video graphics embodiment of the data processing system of FIG. 1.

FIG. 2 illustrates a video graphics circuit embodiment of the data processing system of FIG. 1. The data processing system 23 of FIG. 2 illustrates a data processing system for a video graphics circuit. The processing performed by data processing system 23 relates to video graphics processing wherein a plurality of data blocks, including data block 20, is representative of a sub-frame, frame and/or frame grouping of two-dimensional video graphics, three-dimensional video graphics and/or digitally encoded video graphics (e.g., MPEG). The data processing system 23 contains the same components and functionality described in data processing system 10 of FIG. 1, except that the second processing entity 30 from FIG. 1 is a video graphics card 30 in FIG. 2. Data processing system 23 also includes a frame buffer 42, a display driver 44, and a display 46.

The video graphics card 30 comprises a driver 32, a processing module 34, an application register 36, and memory 38. Memory 38 stores operating instructions that cause the driver 32 to receive the data retrieval command from the first processing entity 18 of application 12, and provides a command to the processing module 34 to retrieve the application data 21 in data block 20 from memory block 24. It should be noted that the operating instructions can cause the driver 32 to receive a plurality of data retrieval commands from a plurality of applications and provide a command to the processing module to retrieve application data produced by a plurality of applications from a plurality of buffers. The operating instructions also cause the driver 32 to transfer the address of the next memory block to application register 36 in accordance with the sequential updating command. The memory block status and the updated memory block status are stored in the memory block status register 40 by the application register 36. The updated memory block status is then provided to register 40 in accordance with the sequential updating command such that the first processing entity 18 of application 12 may retrieve the information.

The processing module 34, based on a write command of an address of next memory block in the memory block status update command, writes the address of the next memory block into the application register 36 and/or the frame buffer 42. The frame buffer 42 is operably coupled to receive the next memory block from processing module 34. The memory block contains a rendered image or a portion of a rendered image from a rendering module (not shown). The frame buffer may be a dual buffer consisting of a front buffer and a back buffer. In the dual buffer configuration, the front buffer is operably coupled to display driver 44 to provide filtered images from a filter (not shown) thereto, while the back buffer is used to store the currently rendered image. When the currently rendered image is completed, the front and back buffers flip designations such that the currently rendered image is provided to display driver 44. Display driver 44 then provides the rendered image to display 46 which may be a computer monitor, a television, an LCD panel, and/or any other device that displays pixel information. A description of processing an image including a rendering module and filter, is included in U.S. Pat. No. 6,097,400 issued Aug. 1, 2000, entitled "Method and Apparatus for Anti-Aliasing Post Rendering of an Image," assigned to the same assignee as the present invention, which patent is incorporated herein by reference.

In the past, a first processing entity or host processor would write one of a plurality of data blocks into one of a plurality of memory blocks in a buffer while a video graphics card or co-processor would read the one of a plurality of data blocks. If the host processor was writing data blocks to the memory blocks faster than the co-processor could read the data blocks, the buffer would become full and the host processor would have to poll the co-processor to see if the co-processor had finished reading a data block in a memory block. Only then could the host processor write a new data block to that memory block. Such polling is wasteful and time consuming because it causes the host processor to wait while the co-processor reads a data block and causes the co-processor to wait while the host processor writes a data block. The alternating of processing and waiting between the host processor and co-processor continues until the co-processor has completed its task. In contrast, the present invention allows the host processor to continually write a data block or plurality of data blocks for a given function.

In accordance with the present invention, the host processor causes the video graphics card to retrieve a data block from a memory block and, after the video graphics card has retrieved the data block, causes the video graphics card to write a new pointer to the first entry in the next memory block of the buffer. The data block in the next memory block is then written to a local register where it can be processed or output to a display through a frame buffer and display driver. The host processor no longer has to poll the video graphics card resulting in greater concurrency between the host processor and video graphics card when processing data.

Figure 3:
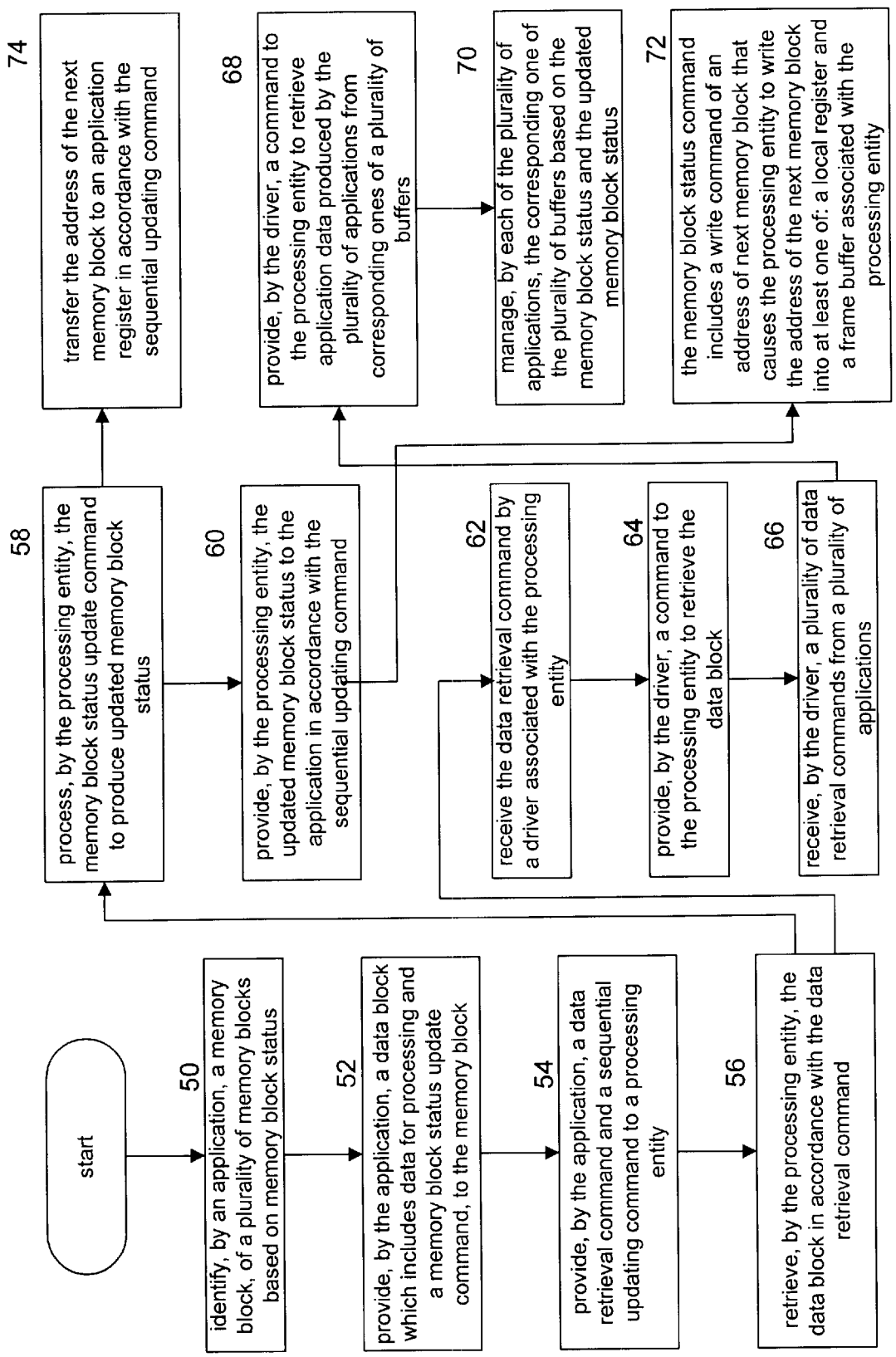
FIG. 3 illustrates a logic diagram of a method for processing data with improved concurrency in accordance with the present invention.

FIG. 3 illustrates a logic diagram of a method for processing data with improved concurrency. The process begins at step 50 where a memory block of a plurality of memory blocks based on memory block status is identified by an application. The process then proceeds to step 52 where a data block is provided by the application to the memory block, wherein the data block includes data for processing and a memory block status update command. The process then proceeds to step 54 where a data retrieval command and a sequential updating command are provided by the application to a processing entity. The process then proceeds to step 56 where the data block, in accordance with the data retrieval command, are retrieved by the processing entity.

The process then proceeds to step 58 where the memory block status update command, to produce updated memory block status, is processed by the processing entity. Step 74 provides a more detailed logical operation of step 58 in that, to process the memory block status update command, the processing entity transfers the address of the next memory block to the application register in accordance with the sequential updating command. The process then proceeds to step 60 where the updated memory block status is processed by the processing entity in accordance with the sequential updating command. Such processing may be done by receiving a write command that is contained within the memory block status command, wherein the write command causes the processing entity to write the address of next memory block into at least one of a local register and a frame buffer associated with the processing entity.

From step 56, the process also proceeds to step 62 where a driver associated with the processing entity receives the data retrieval command, such that the driver controls the retrieval of the data block. The process then proceeds to step 64 where the driver provides a command to the processing entity causing the processing entity to retrieve the data block.

As an illustration of further processing, FIG. 3 includes steps 66–70, which illustrate the operation of being coupled to multiple applications. At step 66, the driver receives a plurality of data retrieval commands from a plurality of applications. The process then proceeds to step 68 where the driver commands the processing entity to retrieve application data produced by the plurality of applications from corresponding ones of a plurality of buffers (i.e., one for each application). The process then proceeds to step 70 where the corresponding one of the plurality of buffers, based on the memory block status and the updated memory block status, is managed by each of the plurality of applications.

The preceding discussion has presented a method and apparatus for processing data with improved concurrency. By causing the video graphics card to retrieve a data block from a memory block and writing a new pointer to the first entry in the next memory block of the buffer, the data block in the next memory block is written to a local register where it can be processed or output to a display through a frame buffer and display driver. The host processor no longer has to poll the video graphics card resulting in greater concurrency between the host processor and video graphics card when processing data. As one of average skill in the art would readily appreciate, the present invention is applicable to a wide variety of co-processing environments and should not be listed to just the video graphics arena. As such, other embodiments may be developed in accordance with the teachings of the present invention.

What is claimed is:

1. A method for processing data, the method comprises the steps of:

instructing, by an application, a processing entity to retrieve a data block from a memory block of a buffer, which data block comprises a command;

retrieving, by the processing entity, the data block;

providing, by the processing entity based at least in part upon the command, an address of a next memory block in the buffer to a first register; and instructing, by the application, the processing entity to provide the address of the next memory block in the first register to a second register, wherein the application can access the address of the next memory block in the second register.

2. The method of claim 1, wherein the application comprises a video graphics application.

3. The method of claim 1, wherein the step of instructing the processing entity to retrieve the data block further comprises:

receiving a data retrieval command by a driver associated with the processing entity; and instructing, by the driver, the processing entity to retrieve the data block.

4. The method of claim 3 further comprises:

receiving, by the driver, a plurality of data retrieval commands from a plurality of applications; and instructing, by the driver, the processing entity to retrieve application data produced by the plurality of applications from corresponding ones of a plurality of buffers.

5. A data processing system comprising:

a first processing entity operable to process at least one application;

a buffer operably coupled to the first processing entity, wherein the buffer includes a plurality of memory blocks, wherein the first processing entity provides application data to at least one of the plurality of memory blocks based on the processing of the at least one application, the application data comprising a command; and a second processing entity operable to process the application data, wherein the first processing entity instructs the second processing entity to retrieve the application data provided to the at least one of the plurality of memory blocks, the second processing entity provides an address of a next memory block in the buffer to a first register in response to the command, and wherein the first processing entity instructs the second processing entity to provide the address of the next memory block in the first register to a second register that is accessible by the first processing entity.

6. The data processing system of claim 5, wherein the first register is local to the second processing entity.

7. The data processing system of claim 5, wherein the second processing entity comprises a driver and a processing module, wherein the driver instructs the processing module to retrieve the application data from the at least one of the plurality of memory blocks in response to a data retrieval command received from the first processing entity.

8. A processing entity comprising:

a processing module; and memory operably coupled to the processing module, wherein the memory stores operating instructions that, when executed by the processing module, causes the processing module to retrieve a data block from a memory block of a buffer, wherein the data block is provided by an application and comprises a command, to provide an address of a next memory block in the buffer to a first register in accordance with the command, and to provide the address of the next memory block in the first register to a second register that is accessible by the application.

9. The processing entity of claim 8, wherein the application comprises a video graphics application.

10. The processing entity of claim 8, wherein the operating instructions further comprise a driver that:

receives a data retrieval command; and instructs the processing module to retrieve the data block.

11. The processing entity of claim 10, wherein the driver:

receives a plurality of data retrieval commands from a plurality of applications; and instructs the processing module to retrieve application data produced by the plurality of applications from corresponding ones of a plurality of buffers.

* * * * *